United States Patent
Nariyama

(10) Patent No.: US 10,286,704 B2
(45) Date of Patent: May 14, 2019

(54) METHOD FOR FORMING BRAILLE TEXT AND PRINT

(71) Applicant: Roland DG Corporation, Hamamatsu-shi, Shizuoka (JP)

(72) Inventor: Yoshihiro Nariyama, Hamamatsu (JP)

(73) Assignee: ROLAND DG CORPORATION, Shizuoka (JP)

( * ) Notice: Subject to any disclaimer, the term of this patent is extended or adjusted under 35 U.S.C. 154(b) by 24 days.

(21) Appl. No.: 15/632,508

(22) Filed: Jun. 26, 2017

(65) Prior Publication Data

US 2018/0326746 A1  Nov. 15, 2018

(30) Foreign Application Priority Data

May 9, 2017 (JP) ................. 2017-092895

(51) Int. Cl.
*B41M 3/16* (2006.01)
*B41J 11/00* (2006.01)
(Continued)

(52) U.S. Cl.
CPC ............. *B41M 3/16* (2013.01); *B29C 64/393* (2017.08); *B41J 2/2114* (2013.01); *B41J 2/2117* (2013.01); *B41J 3/32* (2013.01); *B41J 11/002* (2013.01); *C09D 11/101* (2013.01); *C09D 11/30* (2013.01); *H04N 1/27* (2013.01); *B41J 2/01* (2013.01)

(58) Field of Classification Search
CPC ..... B41J 3/32; B41J 11/002; B41J 2/01; B41J 3/407; B41J 11/0015; B41J 25/308; B41J 2/435; B41J 3/00; B41J 2/2117; B41J 2/2114; C09D 11/101; C09D 11/30;
(Continued)

(56) References Cited

U.S. PATENT DOCUMENTS 9,498,977 B2  11/2016 Allen et al.
2006/0001913 A1*  1/2006 Akaiwa ...................... B41J 3/32
358/3.29
(Continued)

FOREIGN PATENT DOCUMENTS

| JP | 2005-216328 A | 8/2005 |
| JP | 2009-073517 A | 4/2009 |
| JP | 2012-207084 A | 10/2012 |
| JP | 2014-010247 A | 1/2014 |

OTHER PUBLICATIONS

Nariyama, "Method for Forming Braille Text and Inkjet Printer", U.S. Appl. No. 15/969,811, filed May 3, 2018.

*Primary Examiner* — Yaovi M Ameh
(74) *Attorney, Agent, or Firm* — Keating & Bennett, LLP

(57) ABSTRACT

In a method for forming braille text on a recording medium, the braille text includes a plurality of cells with one or more dots included in each cell, and at least one of the cells includes a plurality of dots. The method includes discharging a photocurable ink onto the recording medium and curing with light the discharged photocurable ink, to form a print layer on the recording medium, and discharging a photocurable ink onto the print layer and curing with light the discharged photocurable ink, to form at least one additional print layer on the print layer. Resultant braille text is formed by the print layer and the at least one additional print layer, and the resultant braille text has an intra-cell dot-to-dot spacing of about 0.38 mm or more and about 1.32 mm or less.

13 Claims, 8 Drawing Sheets

(51) Int. Cl.
*B29C 64/393* (2017.01)
*B41J 3/32* (2006.01)
*C09D 11/101* (2014.01)
*H04N 1/27* (2006.01)
*B41J 2/21* (2006.01)
*C09D 11/30* (2014.01)
*B41J 2/01* (2006.01)

(58) Field of Classification Search
CPC ...... B41M 3/16; B41M 7/0081; B41M 7/009; B41M 3/00; H04N 1/27; B29C 64/393
USPC ...... 347/101, 102; 400/109, 109.1; 434/112, 434/113
See application file for complete search history.

(56) References Cited

U.S. PATENT DOCUMENTS

| | | | |
|---|---|---|---|
| 2006/0153619 A1* | 7/2006 | Kurashina | B41J 3/32 400/109.1 |
| 2011/0020771 A1* | 1/2011 | Rea | G09B 21/02 434/114 |
| 2011/0116152 A1* | 5/2011 | Guigan | B29D 11/00365 359/242 |
| 2012/0252919 A1 | 10/2012 | Suzuki et al. | |
| 2012/0304875 A1* | 12/2012 | Pillischer | B41J 3/32 101/24 |
| 2017/0050449 A1* | 2/2017 | Ikeda | B41J 11/002 |

* cited by examiner

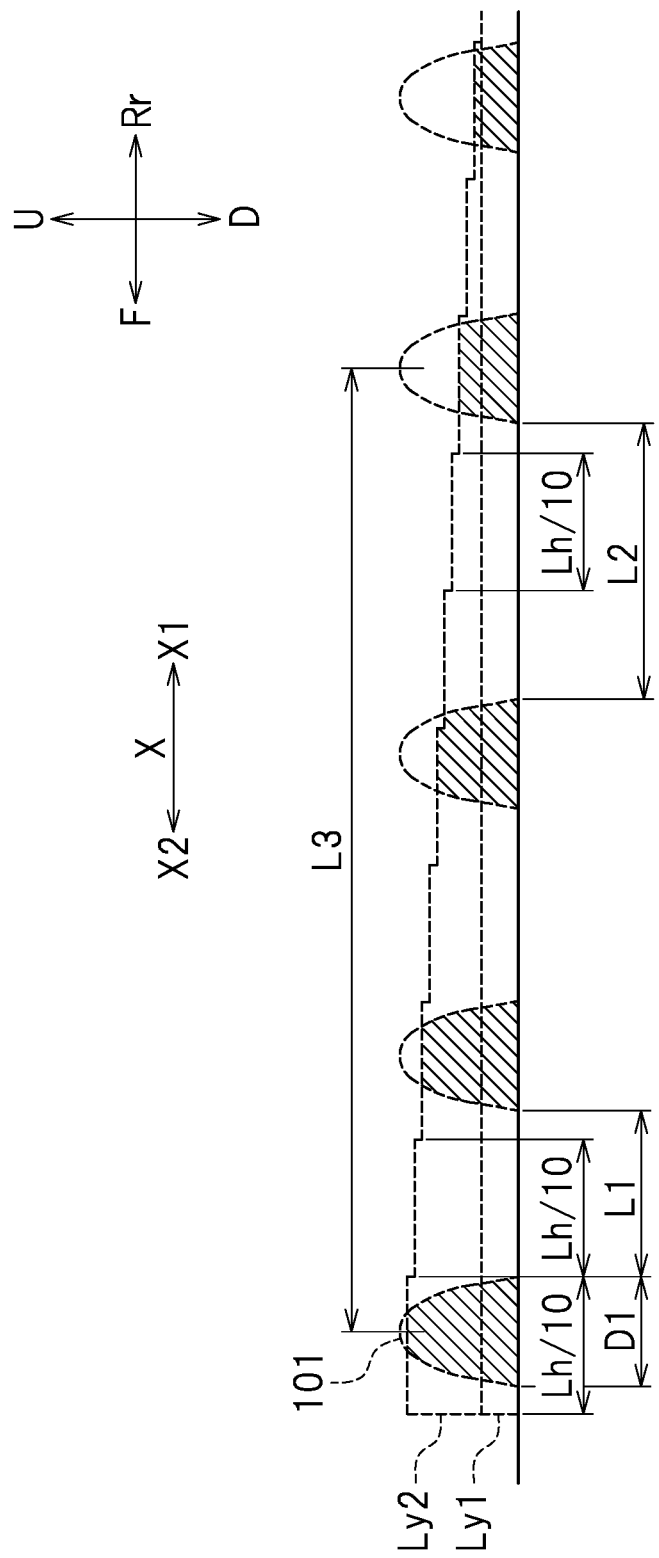

10,286,704 B2

METHOD FOR FORMING BRAILLE TEXT AND PRINT

CROSS REFERENCE TO RELATED APPLICATIONS

This application claims the benefit of priority to Japanese Patent Application No. 2017-092895 filed on May 9, 2017. The entire contents of this application are hereby incorporated herein by reference.

BACKGROUND OF THE INVENTION

1. Field of the Invention

The present invention relates to a method for forming braille text and for forming a print.

2. Description of the Related Art

ADA (Americans with Disabilities Act of 1990)-compliant braille text and 3D signage have been used in the art. Braille text is produced by, for example, embossing, and 3D signage is produced by machining, molding, or any other various techniques.

It is difficult to produce braille text in a simple and quick manner because it requires embossing a recording medium, etc. It is also difficult to produce 3D signage in a simple and quick manner because the production requires machine tools, molding machines, molds, etc.

SUMMARY OF THE INVENTION

A method for forming braille text according to a preferred embodiment of the present invention is a method for forming braille text on a recording medium, the braille text including a plurality of cells with one or more dots included in each cell, at least one of the cells including a plurality of dots included therein, the method including the steps of: discharging a photocurable ink onto the recording medium and curing with light the discharged photocurable ink, to form a print layer on the recording medium; and discharging a photocurable ink onto the print layer and curing with light the discharged photocurable ink, to form at least one additional print layer on the print layer. Resultant braille text is formed by the print layer and the at least one additional print layer, and the resultant braille text has an intra-cell dot-to-dot spacing of about 0.38 mm or more and about 1.32 mm or less.

Another method for forming braille text according to a preferred embodiment of the present invention is a method for forming braille text on a recording medium, the braille text including a plurality of cells with one or more dots included in each cell, the method including the steps of: discharging a photocurable ink onto the recording medium and curing with light the discharged photocurable ink, to form a print layer on the recording medium; and discharging a photocurable ink onto the print layer and curing with light the discharged photocurable ink, to form at least one additional print layer on the print layer. Resultant braille text is formed by the print layer and the at least one additional print layer, and the resultant braille text has a dot diameter of about 1.2 mm or more and about 1.9 mm or less.

Still another method for forming braille text according to a preferred embodiment of the present invention is a method for forming braille text on a recording medium, the braille text including a plurality of dots, the method including the steps of: discharging a photocurable ink onto the recording medium and curing with light the discharged photocurable ink, to form a print layer on the recording medium; and discharging a photocurable ink onto the print layer and curing with light the discharged photocurable ink, to form at least one additional print layer on the print layer, wherein resultant braille text is formed by the print layer and the at least one additional print layer, and ink dots of the photocurable ink upon landing have a diameter that is about one half or less of a dot diameter of the resultant braille text.

Still another method for forming braille text according to a preferred embodiment of the present invention is a method for forming braille text on a recording medium, the braille text including a plurality of dots, the method including the steps of: discharging a photocurable ink onto the recording medium and curing with light the discharged photocurable ink, to form a print layer on the recording medium; and discharging a photocurable ink onto the print layer and curing with light the discharged photocurable ink, to form at least one additional print layer on the print layer, wherein resultant braille text is formed by the print layer and the at least one additional print layer, and ink dots of the photocurable ink upon landing have a diameter that is about one third or less of a dot diameter of the resultant braille text.

Still another method for forming braille text according to a preferred embodiment of the present invention is a method for forming braille text on a recording medium, the braille text including a plurality of cells with one or more dots included in each cell, the method including the steps of: discharging a photocurable ink onto the recording medium and curing with light the discharged photocurable ink, to form a print layer on the recording medium; and discharging the photocurable ink onto the print layer and curing with light the discharged photocurable ink, to form at least one additional print layer on the print layer. The formation of at least one of the print layer and the at least one additional print layer includes a step of repeating the discharging and curing of the photocurable ink and an operation of moving the recording medium in a first direction over a first distance, wherein the first distance is greater than a dot diameter of resultant braille text.

A method for forming a print according to a preferred embodiment of the present invention is a method for forming a print on a recording medium, the method including the steps of: discharging the photocurable ink onto the recording medium and curing with light the discharged photocurable ink, to form a first print layer on the recording medium; and discharging a photocurable ink onto the recording medium and curing with light the discharged photocurable ink, to form a second print layer over the first print layer. In the present formation method, the discharging and curing of the photocurable ink and an operation of moving the recording medium in a first direction are repeated a first number of iterations per a predetermined distance in the first direction, to form the first print layer; and the discharging and curing of the photocurable ink and an operation of moving the recording medium in the first direction are repeated a second number of iterations, different from the first number of iterations, per the predetermined distance in the first direction, to form the second print layer.

Another method for forming a print according to a preferred embodiment of the present invention is a method for forming a print on a recording medium, the method including the steps of: discharging a photocurable ink onto the recording medium and curing with light the discharged photocurable ink, to form a print layer on the recording medium; and discharging a photocurable ink onto the print layer and curing with light the discharged photocurable ink, to form at least one additional print layer on the print layer. The formation of at least one of the print layer and the at least one additional print layer includes: a first step of discharging the photocurable ink onto a first area on the recording medium; a second step, after the first step, of moving the recording medium in a first direction; and a third step, after the second step, of discharging the photocurable ink onto a second area on the recording medium and further discharging the photocurable ink onto the first area, the second area being located in a second direction, which is opposite to the first direction, from the first area. Upon completion of the third step, a height of the first area is greater than a height of the second area.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 7 shows the relationship between the recording medium feed length and the dot arrangement.

DETAILED DESCRIPTION OF THE PREFERRED EMBODIMENTS

Some preferred embodiments of the present invention will now be described with reference to the drawings. Note that the preferred embodiments to be described hereinbelow are not intended to limit the scope of the present invention. Elements/sections of the same function will be denoted by the same reference signs, and redundant descriptions will be omitted or simplified. In the following description, when an inkjet printer is seen from the front side, the direction away from the inkjet printer will be referred to as "front" and the direction toward the inkjet printer as "rear". The character "Y" in the figures denotes the primary scanning direction and the character "X" the secondary scanning direction perpendicular to the primary scanning direction Y. Of the primary scanning direction Y, the direction that corresponds to the leftward direction of the inkjet printer is denoted as "first primary scanning direction Y1" and the direction that corresponds to the rightward direction thereof as "second primary scanning direction Y2". Of the secondary scanning direction X, the direction that corresponds to the rearward direction of the inkjet printer is denoted as "upstream X1" and the direction that corresponds to the forward direction thereof as "downstream X2". The designations F, Rr, L, R, U and D, as used in the figures, refer to front, rear, left, right, up and down, respectively. Note however that these designations of direction are used merely for the purpose of illustration, and do not limit how the inkjet printer is installed, etc.

Figure 1:
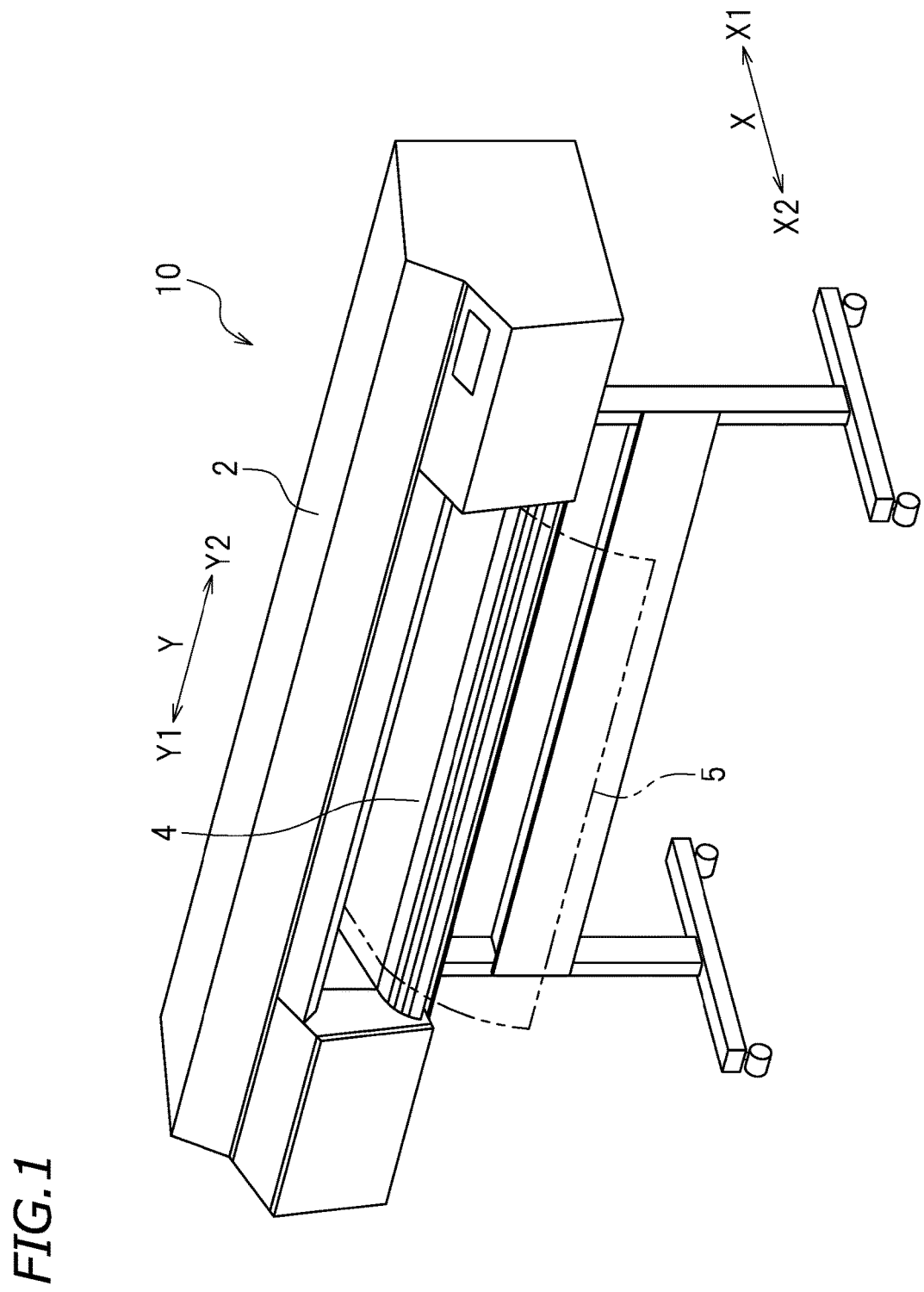
FIG. 1 is a perspective view of an inkjet printer according to a preferred embodiment of the present invention.

FIG. 1 is a perspective view of an inkjet printer 10 according to the present preferred embodiment. The inkjet printer 10 includes a casing 2, and a platen 4 that supports a recording medium 5.

Figure 2:
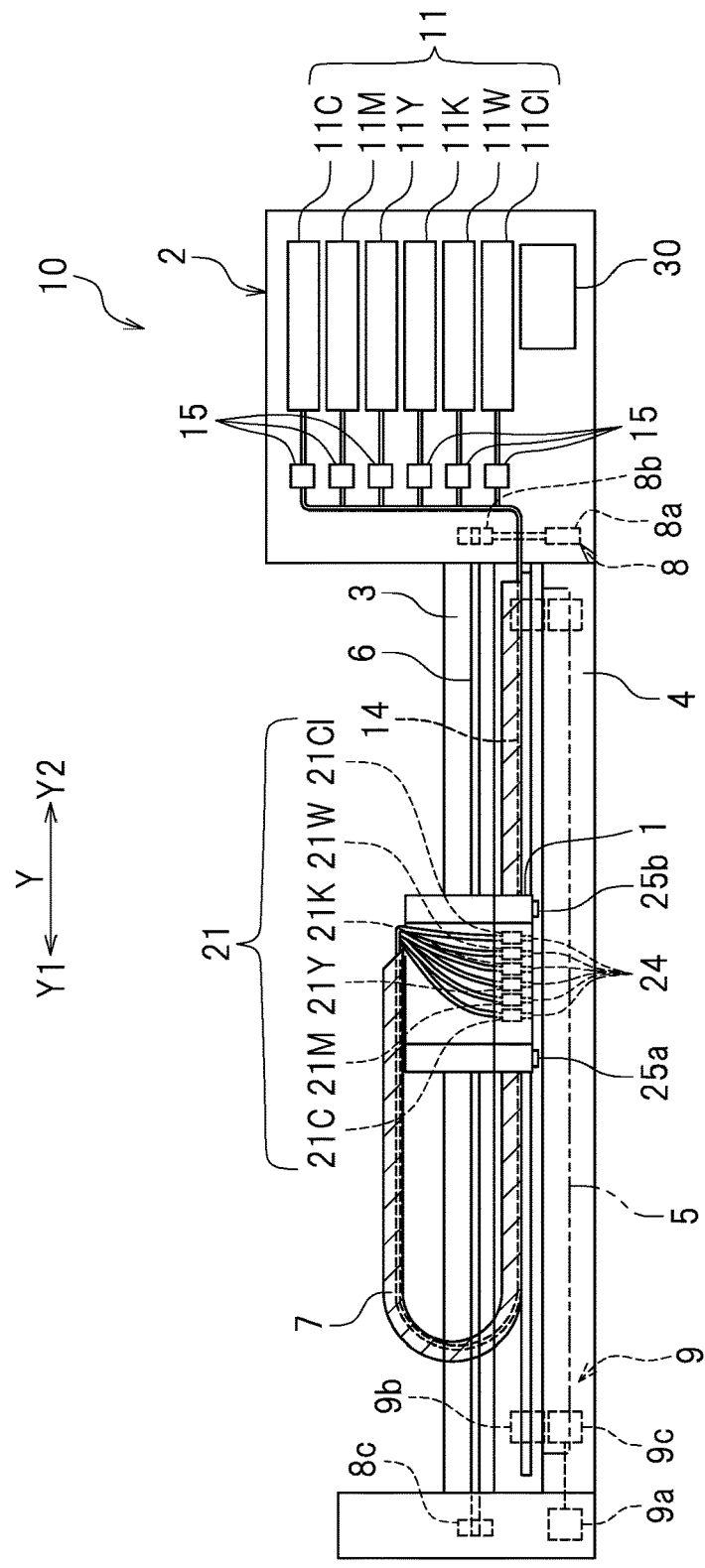
FIG. 2 is a front view of a main portion of the inkjet printer.

FIG. 2 is a front view showing the main portion of the inkjet printer 10. The main portion is inside the casing 2. The inkjet printer 10 includes a guide rail 3 in the casing 2. The guide rail 3 extends in the primary scanning direction Y and is secured on the left wall and the right wall of the casing 2. A carriage 1 is in engagement with the guide rail 3. The carriage 1 includes an ink discharge head 21 mounted thereon.

Figure 3:
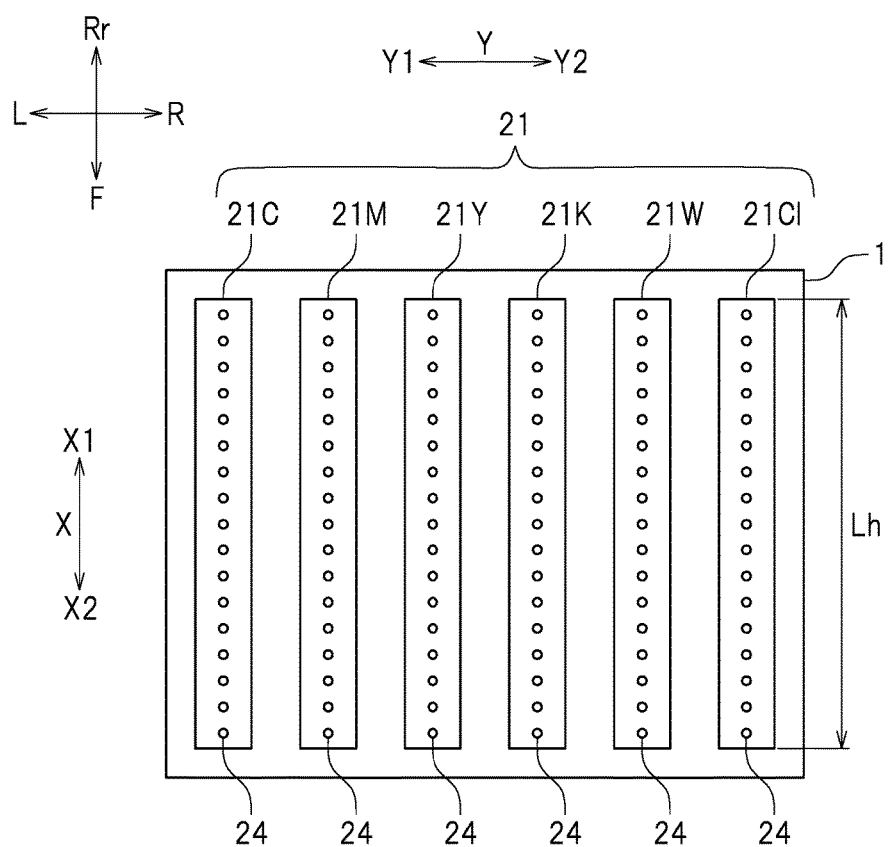
FIG. 3 shows a configuration of the bottom surface of the carriage.

FIG. 3 shows a configuration of the bottom surface of the carriage 1. As shown in FIG. 3, the ink discharge head 21 is mounted on the bottom surface of the carriage 1. The ink discharge head 21 preferably includes six ink heads 21C, 21M, 21Y, 21K, 21W and 21C1, for example. The ink heads 21C, 21M, 21Y, 21K, 21W and 21C1 are aligned in the primary scanning direction Y. Each of the ink heads 21C, 21M, 21Y, 21K, 21W and 21C1 includes a plurality of nozzles 24 that are aligned in the secondary scanning direction X. The pitch of the nozzles 24 is preferably the same or substantially the same for all of the ink heads 21C, 21M, 21Y, 21K, 21W and 21C1. The number of nozzles 24 is also preferably the same or substantially the same for all of the ink heads 21C, 21M, 21Y, 21K, 21W and 21C1. The positions of the nozzles 24 in the secondary scanning direction X are preferably the same or substantially the same for the ink heads 21C, 21M, 21Y, 21K, 21W and 21C1.

As shown in FIG. 2, the inkjet printer 10 includes an ink tank 11 storing ink therein. The inks stored therein preferably are UV-curable inks that cure when irradiated with UV light, for example. The ink tank 11 includes ink tanks 11C, 11M, 11Y, 11K, 11W and 11C1 storing therein a cyan ink, a magenta ink, a yellow ink, a black ink, a white ink and a clear ink, respectively. Note however that there is no particular limitation on the colors of the inks. Although inks of four colors are preferably used as color inks in the present preferred embodiment, the number of color inks used in the inkjet printer 10 is not limited to four. While two types of inks, i.e., a white ink and a clear ink, are preferably used as special color inks other than color inks, the special color inks to be used in the inkjet printer 10 are not limited thereto. There is no particular limitation on the number of ink tanks 11.

The ink heads 21C, 21M, 21Y, 21K, 21W and 21C1 are connected to the ink tanks 11C, 11M, 11Y, 11K, 11W and 11C1, respectively, through ink paths 14. The inkjet printer 10 includes an ink path 14 connected to the ink head 21C and the ink tank 11C, an ink path 14 connected to the ink head 21M and the ink tank 11M, an ink path 14 connected to the ink head 21Y and the ink tank 11Y, an ink path 14 connected to the ink head 21K and the ink tank 11K, an ink path 14 connected to the ink head 21W and the ink tank 11W, and an ink path 14 connected to the ink head 21C1 and the ink tank 11C1. While there is no particular limitation on the structure and the material of the ink paths 14, resin tubes are preferably used in the present preferred embodiment. The ink paths 14 supply inks from the ink tanks 11C, 11M, 11Y, 11K, 11W and 11C1 to the ink heads 21C, 21M, 21Y, 21K, 21W and 21C1, respectively. The ink paths 14 include pumps 15 that pump the inks from the ink tanks 11C, 11M, 11Y, 11K, 11W and 11C1 toward the ink heads 21C, 21M, 21Y, 21K, 21W and 21C1, respectively. Note however that the pumps 15 may not be necessary and can be omitted. A portion of the ink paths 14 extends in the left-right direction and is wrapped around by a cable protecting/guiding device 7.

The carriage 1 includes a first UV lamp 25a and a second UV lamp 25b. The first UV lamp 25a is located on the left side of the ink discharge head 21. The second UV lamp 25b is located on the right side of the ink discharge head 21.

The carriage 1 is capable of being slid by a carriage moving mechanism 8 in the primary scanning direction Y along the guide rail 3. The carriage moving mechanism 8 includes pulleys 8b and 8c at the right end side and the left end side, respectively, of the guide rail 3. A carriage motor 8a is linked to the pulley 8b. The pulley 8b is driven and rotated by the carriage motor 8a. An endless belt 6 is wound around the pulleys 8b and 8c. The carriage 1 is secured on the belt 6. The belt 6 runs as the pulleys 8b and 8c rotate, to move the carriage 1 in the primary scanning direction Y.

The recording medium 5 is fed by a feeder mechanism 9 downstream X2 in the secondary scanning direction X. The platen 4 is provided under the carriage 1. A pinch roller 9b that holds down the recording medium 5 is provided over the platen 4. A grid roller 9c is provided under the pinch roller 9b. The grid roller 9c is linked to a feed motor 9a. The grid roller 9c is driven and rotated by the feed motor 9a. As the grid roller 9c rotates with the recording medium 5 sandwiched between the grid roller 9c and the pinch roller 9b, the recording medium 5 is fed downstream X2 in the secondary scanning direction X.

The recording medium 5 is a medium on which the discharged ink lands, to form a print on the surface thereof. There is no particular limitation on the material and the configuration of the recording medium 5. For example, the recording medium 5 may be a sheet or film of paper or resin, or may be a plate of wood, metal or resin, for example.

The inkjet printer 10 includes a controller 30. Although there is no particular limitation on the hardware configuration thereof, the controller 30 may be a computer including a CPU, a ROM, a RAM, etc. The controller 30 is connected to the carriage motor 8a, the feed motor 9a, the ink discharge head 21 and the first and second UV lamps 25a and 25b so that the controller 30 communicates with, and control, these elements. The controller 30 preferably is configured or programmed to control the carriage motor 8a, the feed motor 9a, the ink discharge head 21 and the first and second UV lamps 25a and 25b, thus printing on the recording medium 5.

First Preferred Embodiment

Figure 4:
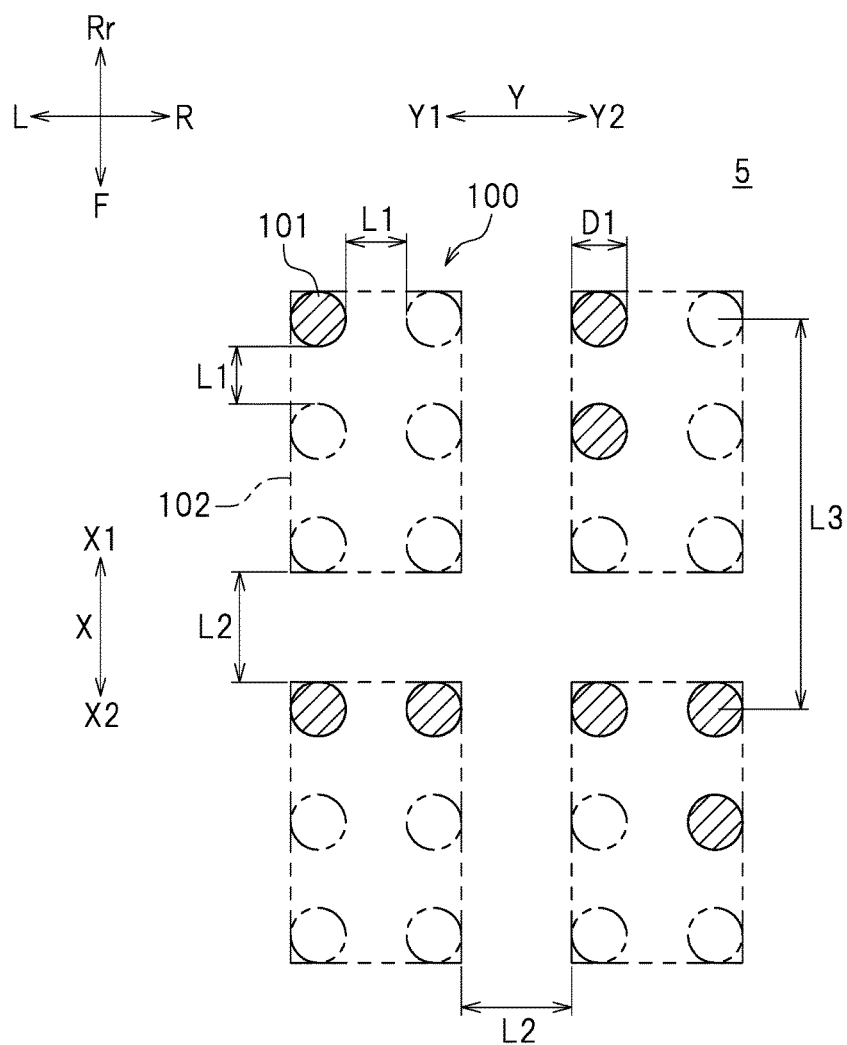
FIG. 4 shows a configuration of braille text.

In the first preferred embodiment, the inkjet printer 10 forms braille text on the recording medium 5. FIG. 4 shows a configuration of braille text formed by the inkjet printer 10 according to the present preferred embodiment. Each letter 100 of braille text shown in FIG. 4 includes a maximum of six dots 101. The dots 101 are formed three-dimensionally on the recording medium 5. Braille text represents an alphabet letter based on the presence/absence of a dot 101 at each of the six predetermined positions. Each circle in FIG. 4 that is hatched and delimited by a solid line represents a position where the dot 101 is actually formed on the recording medium 5. Each circle in FIG. 4 that is delimited by a two-dot-chain line represents a position where the dot 101 is actually absent on the recording medium 5. Adjacent dots 101 in each letter are spaced apart from each other by a predetermined distance (the dot-to-dot spacing L1) for the primary scanning direction Y and for the secondary scanning direction X. In the description of the present preferred embodiment, the rectangular shape that circumscribes six dots 101 is referred to as a cell 102. Adjacent cells 102, i.e., adjacent letters 100, are spaced apart from each other by a predetermined distance (the inter-cell spacing L2) for the primary scanning direction Y and for the secondary scanning direction X.

Braille text shown in FIG. 4 is formed from ink discharged from the ink discharge head 21 of the inkjet printer 10. Braille text is a print produced by the inkjet printer 10. While there is no particular limitation on the types of ink to form braille text, a white ink and a clear ink are preferably used herein, for example.

Figure 5:
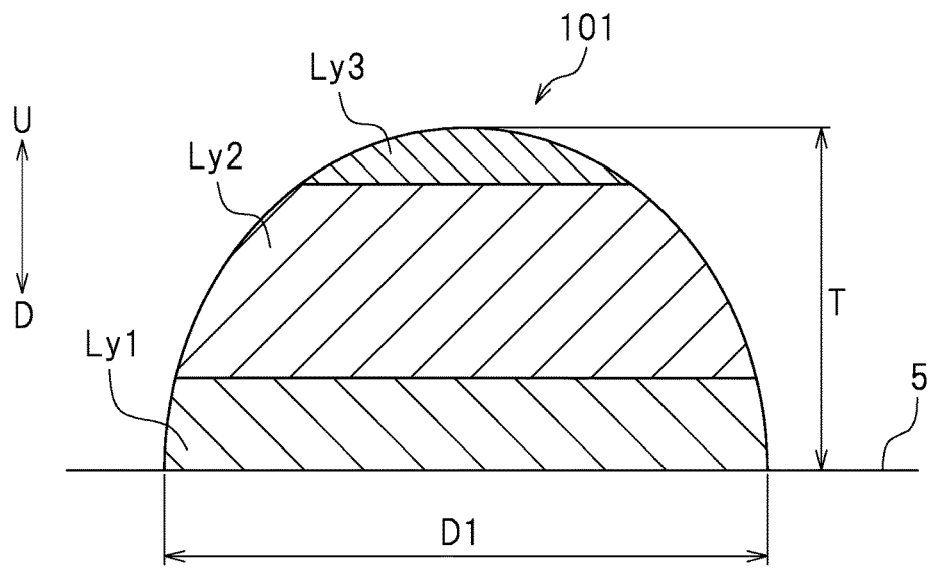
FIG. 5 is a vertical cross-sectional view of a dot of braille text.

FIG. 5 is a vertical cross-sectional view of a dot 101 of braille text. Note however that FIG. 5 is a schematic view, and may not necessarily represent the actual proportion of the various portions. Braille text of FIG. 5 includes three print layers. A first print layer Ly1, of the three print layers, is formed directly on the recording medium 5. The first print layer Ly1 is the lowermost layer of the three print layers. The first print layer Ly1 is formed from the clear ink. A second print layer Ly2 is formed directly on the first print layer Ly1. The second print layer Ly2 is also formed from the clear ink. A third print layer Ly3 is formed directly on the second print layer Ly2. The third print layer Ly3 is the uppermost layer of the three print layers. The third print layer Ly3 is formed from the white ink.

The first print layer Ly1 according to the present preferred embodiment is a "matte" print layer of the clear ink. The matte print layer has relatively large surface irregularities, thereby resulting in a glossless finish. During the formation of the first print layer Ly1, the controller 30 causes the clear ink to be discharged from the ink head 21C1 while moving the carriage 1 in the primary scanning direction Y. The controller 30 causes the clear ink to be discharged from the ink head 21C1 while moving the carriage 1 in the first primary scanning direction Y1 (leftward). The print direction of the inkjet printer 10 according to the present preferred embodiment is the first primary scanning direction Y1. When discharging the clear ink, the second UV lamp 25b outputs UV light toward the recording medium 5. The second UV lamp 25b is located on the second primary scanning direction Y2 (rightward) side relative to the ink discharge head 21. That is, it is rearward in the print direction. When forming the first print layer Ly1, the clear ink is cured by UV light output from the second UV lamp 25b immediately after being discharged. Thus, the clear ink is cured while its graininess still remains. Therefore, relatively large irregularities remain on the surface of the matte print layer. In this process, the first UV lamp 25a does not need to be lit. The controller 30 moves the carriage 1 over the print area, scanning the print area in the first primary scanning direction Y1, to form a print layer for one scanning line. Then, the carriage 1 is returned in the second primary scanning direction Y2. The inkjet printer 10 according to the present preferred embodiment does not discharge ink at this point. The second primary scanning direction is the return direction.

After forming a print layer for one scanning line, the controller 30 drives the feed motor 9a to feed a predetermined length of the recording medium 5 downstream X2. The predetermined length is the length Lh shown in FIG. 3. The length Lh is equal to the pitch of the nozzles 24 multiplied by the number of nozzles 24. The controller 30 feeds a length Lh of the recording medium 5 downstream X2 per one iteration. Thus, an unprinted area of the recording medium 5 is moved under the ink discharge head 21. The controller 30 similarly discharges and cures ink on this unprinted area of the recording medium 5. The inkjet printer 10 forms the first print layer Ly1 by repeating this operation until the carriage 1 scans across the entire print area. Thus, for the thickness direction, the first print layer Ly1 is formed from a single shot of clear ink.

The second print layer Ly2 is formed on the first print layer Ly1. The second print layer Ly2 according to the present preferred embodiment is a "glossy" print layer of the clear ink. The surface irregularities of the glossy print layer are relatively small, and the surface of the glossy print layer therefore has a gloss. Between the formation of the first print layer Ly1 and the formation of the second print layer Ly2, the recording medium 5 is once returned to the upstream X1 side. Then, the formation of the second print layer Ly2 is started. During the formation of the second print layer Ly2, the first UV lamp 25a is lit. The second UV lamp 25b is turned off. The first UV lamp 25a is located on the first primary scanning direction Y1 (leftward) side relative to the ink discharge head 21. The first UV lamp 25a is located on the front side in the print direction. In other words, the first UV lamp 25a is located on the rear side in the return direction. During the formation of the second print layer Ly2, the controller 30 causes the clear ink to be discharged from the ink head 21C1 while moving the carriage 1 in the first primary scanning direction Y1. The discharged ink is cured by UV light output from the first UV lamp 25a while the carriage 1 is being returned in the second primary scanning direction Y2. In the formation of the second print layer Ly2, an amount of time that is one scanning period or longer passes between discharging ink and curing ink. The first amount of time refers to the amount of time to pass since the ink is discharged until the ink is irradiated with UV light when forming the first print layer Ly1, for example, and the second amount of time is the amount of time to pass since the ink is discharged until the ink is irradiated with UV light when forming the second print layer Ly2 The second amount of time is longer than the first amount of time. The clear ink flattens by virtue of gravity over the second amount of time, to form a relatively smooth surface.

As described above, even if print layers are formed from the same clear ink, the texture will differ between the print layers depending particularly on the amount of time between discharging ink and curing ink. In order to realize an even smoother surface for the glossy print layer, the amount of clear ink per shot may be less than that for the matte print layer. Decreasing the droplet size of the discharged clear ink will make the surface of the cured ink even smoother. However, by decreasing the amount of ink to be discharged and by waiting the ink to flatten before the ink is cured, the print layer to be formed from a single shot of ink will be thin.

When forming the second print layer Ly2, the controller 30 moves the recording medium 5 downstream X2 over a predetermined distance that is shorter than that when forming the first print layer Ly1. For example, the feed length preferably is about 1/10 the feed length Lh used when forming the first print layer Ly1, for example.

Figure 6A:
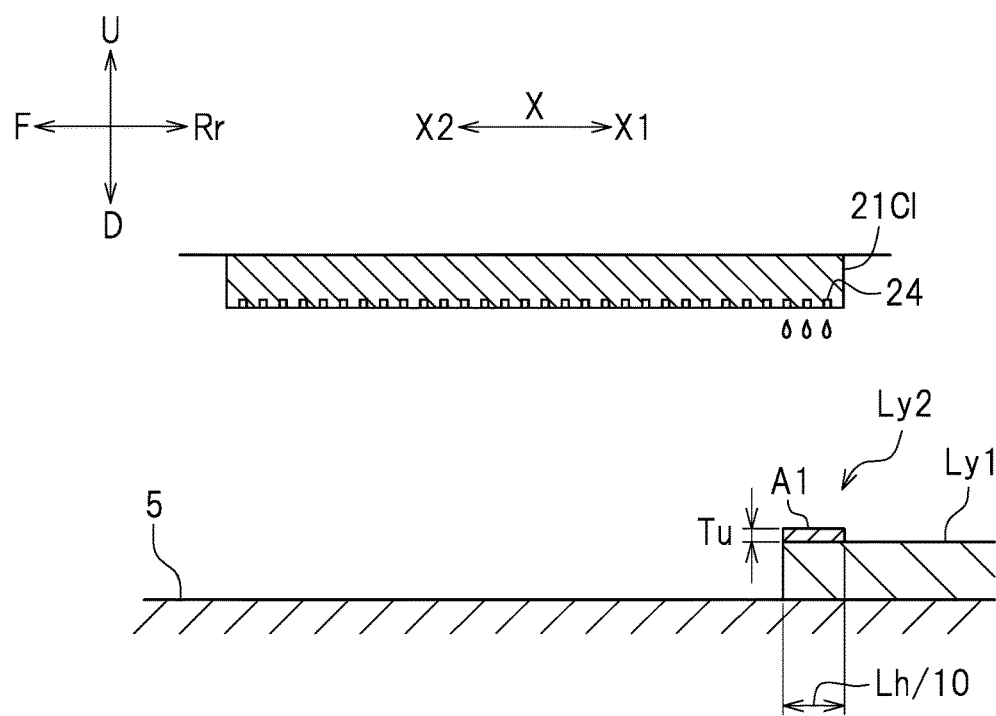
FIG. 6A is a vertical cross-sectional view of a second print layer in the first step after the start of formation.

FIG. 6A is a vertical cross-sectional view of the second print layer Ly2 in the first step after the start of formation. A first area A1 of FIG. 6A is an area of the second print layer Ly2 that is located at the downstream X2 end. In the first step, the controller 30 causes the clear ink to be discharged from a subset of nozzles 24 of the ink head 21C1 that are provided at the upstream X1 end, and the discharged clear ink is cured, to form the first area A1. The length of the first area A1 in the secondary scanning direction X preferably is about Lh/10, for example. The height of the first area A1 from the upper surface of the first print layer Ly1 is Tu as shown in FIG. 6A. The height Tu is the height of a layer to be formed from a single shot of ink. In the following second step, the controller 30 moves the recording medium 5 downstream X2 over the feed length Lh/10.

Figure 6B:
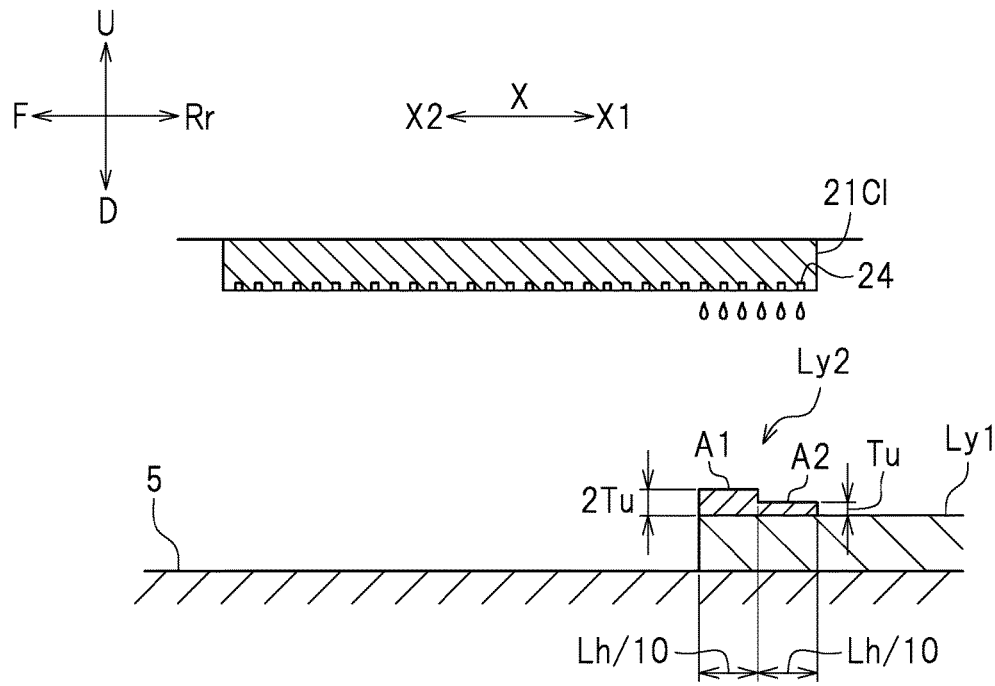
FIG. 6B is a vertical cross-sectional view of the second print layer at the time of a pass following that of FIG. 6A.

FIG. 6B is a vertical cross-sectional view of the second print layer Ly2 at the time of a pass following that of FIG. 6A. A second area A2 is an area of the second print layer Ly2 that is located upstream X1 of the first area A1. In the third step, following the second step, the second area A2 is formed from the clear ink discharged from the subset of nozzles 24 of the ink head 21C1 that are provided at the upstream X1 end in the secondary scanning direction X. The subset of nozzles 24 are those nozzles 24 that have discharged ink onto the first area A1 in FIG. 6A. The length of the second area A2 in the secondary scanning direction X preferably is about Lh/10. The height of the second area A2 from the upper surface of the first print layer Ly1 is Tu. In the third step, simultaneously with the formation of the second area A2, an additional shot of the clear ink is discharged also onto the first area A1 and is cured. The subset of nozzles 24 that discharge ink onto the first area A1 in this step are provided downstream X2 of the subset of nozzles 24 that are discharging ink onto the second area A2. Thus, the subset of nozzles that discharge ink onto the first area A1 in the first step are different from the subset of nozzles that discharge ink onto the first area A1 in the third step. Conversely, the subset of nozzles that discharge ink onto the first area A1 in the first step are the same as the subset of nozzles that discharge ink onto the second area A2 in the third step. As a result of the third step, a layer having the height Tu is further stacked on the first area A1. At the time of FIG. 6B, the height of the first area A1 is 2Tu. The height of the first area A1 at the time of FIG. 6B is greater, by the height Tu, than the height of the second area A2.

Figure 6C:
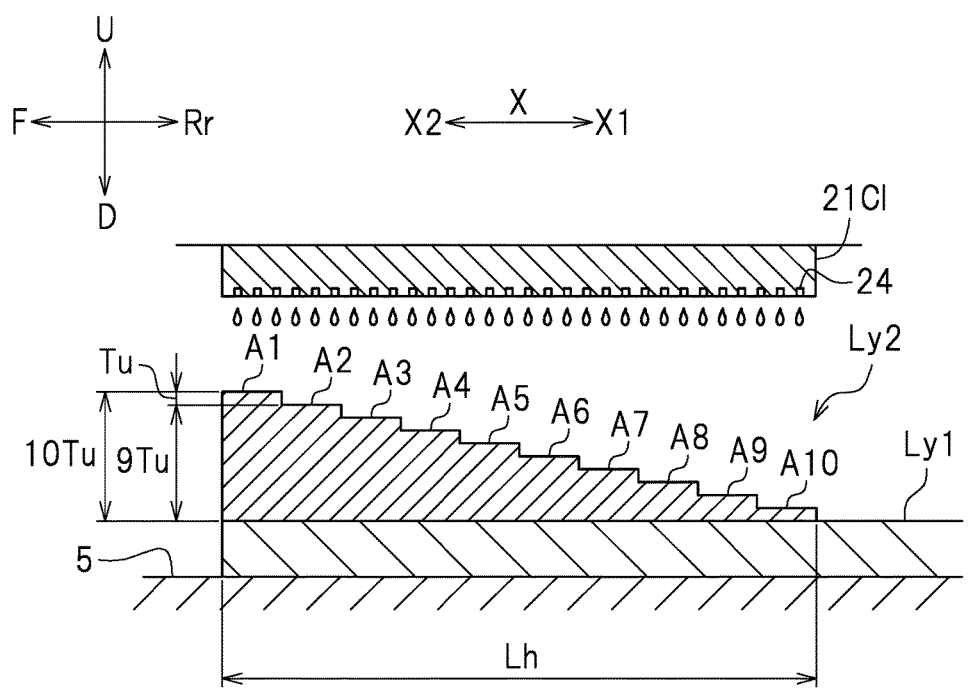
FIG. 6C is a vertical cross-sectional view of the second print layer upon completion of the layer-stacking printing in the first area.

The second print layer Ly2 is formed by repeating these three steps ten times, for example. FIG. 6C is a vertical cross-sectional view of the second print layer Ly2 upon completion of the layer-stacking printing in the first area A1. At the time of FIG. 6C, ten layers are stacked together in the first area A1. The height of the first area A1 is 10Tu. The height of the second area A2 is 9Tu. Until the stacking of ten layers is completed in the first area A1, there will always be one more layer in the first area A1 than in the second area A2. Accordingly, the height of the first area A1 will always be higher by Tu than the height of the second area A2. This similarly holds true for the difference between the height of the second area A2 and the height of a third area A3 that is located upstream X1 of the second area A2. This also holds true for a fourth area A4 to a tenth area A10. The second print layer Ly2 is cascading down toward the upstream X1 side in the secondary scanning direction X. In practice, however, every step portion sags down, to form a smooth slope. After the point in time shown in FIG. 6C, the first area A1 is moved downstream X2 of the ink head 21C1. Thereafter, during the formation of the second print layer Ly2, no ink is discharged onto the first area A1. Thus, for the thickness direction, the second print layer Ly2 preferably is formed from ten shots of the clear ink, for example. For the length Lh, the controller 30 moves the recording medium 5 downstream X2 ten times, for example.

In the formation of the second print layer Ly2, a glossy print layer is formed so as to give a smooth finish to the surface of the braille text. By giving a glossy finish, a print layer to be formed from a single shot will be thin, but this is compensated for by stacking ten layers.

The third print layer Ly3 is formed from the white ink on the second print layer Ly2. As is the second print layer Ly2, the third print layer Ly3 is formed to be glossy. Note however that as opposed to the second print layer Ly2, the third print layer Ly3 is formed in a single scan. For the thickness direction, the third print layer Ly3 is formed from a single shot of the white ink. The controller 30 moves the recording medium 5 downstream X2 over the length Lh per one iteration. The controller 30 intermittently repeats the operation described above, to form the third print layer Ly3.

Through the process described above, braille text including three print layers is formed on the recording medium 5. In the formed braille text, dots 101 in each cell 102 are formed so that the dot-to-dot spacing L1 (see FIG. 4) preferably is about 0.5 mm or more and about 1.2 mm or less, for example. The dimension preferably has a tolerance of about 0.12 mm, for example. Therefore, with the dimension and the tolerance combined together, the dot-to-dot spacing L1 preferably is about 0.38 mm or more and about 1.32 mm or less, for example.

The height T of the dot 101 (see FIG. 5) preferably is about 0.55 mm or more and about 0.95 mm or less, for example. The height preferably has a tolerance of about 0.095 mm, for example. Therefore, with the dimension and the tolerance combined together, the height T of the dot 101 preferably is about 0.455 mm or more and about 1.045 mm or less, for example.

Moreover, the diameter D1 of the dot 101 (see FIG. 4 and FIG. 5) preferably is about 1.4 mm or more and about 1.7 mm or less, for example. The diameter preferably has a tolerance of about 0.2 mm, for example. Therefore, with the dimension and the tolerance combined together, the diameter D1 of the dot 101 preferably is about 1.2 mm or more and about 1.9 mm or less, for example.

Letters 100 are formed so that the distance therebetween, i.e., the inter-cell spacing L2 (see FIG. 4), preferably is about 2.5 mm or more and about 5.0 mm or less, for example. The inter-cell spacing L2 preferably has a tolerance of about 0.2 mm, for example. Therefore, with the dimension and the tolerance combined together, the inter-cell spacing L2 preferably is about 2.3 mm or more and about 5.2 mm or less, for example.

Each dot 101 of the braille text includes ink dots, each of which is smaller than the diameter D1 of the dot 101. The diameter of an ink dot upon landing is smaller than the diameter D1 of the dot 101. Since an ink dot is not necessarily circular, the diameter of an ink dot upon landing herein is an equivalent diameter that is obtained as the diameter of a circle whose area is equal to the area of the ink dot upon landing. The diameter of an ink dot upon landing preferably is about one half or less of the diameter D1 of the dot 101, for example. Alternatively, the diameter of an ink dot upon landing preferably is about one third or less of the diameter D1 of the dot 101, for example. Settings can be changed so that the diameter of an ink dot upon landing is about one tenth or less of the diameter D1 of the dot 101, for example. Conversely, each dot 101 of braille text includes a plurality of ink dots that are formed when ink discharged from the ink discharge head 21 is cured.

During the formation of the second print layer Ly2, the inkjet printer 10 according to the present preferred embodiment feeds a length of about Lh/10 of the recording medium 5 per one iteration, wherein the feed length of about Lh/10 is set to be greater than the diameter D1 of the dot 101. In other words, a natural number N (N is a natural number of 2 or more) is set such that Lh/N is greater than the diameter D1 of the dot 101, where the length Lh of the ink discharge head 21 is a predetermined length. N is the number of layers of the second print layer Ly2. In the present preferred embodiment, N is 10, for example. It is understood that N may preferably be set to any other natural number that satisfies the conditions described above. For example, N may be set to 15, etc. FIG. 7 shows the relationship between the feed length Lh/N of the recording medium 5 (herein, N=10) and the arrangement of dots 101. As shown in FIG. 7, the feed length Lh/10 is greater than the diameter D1 of the dot 101. Note that the hatched portion of a dot 101 of FIG. 7 represents a portion of the dot 101 that has been formed at the time of FIG. 7.

As shown in FIG. 7, the feed length Lh/N during the formation of the second print layer Ly2 is set to be shorter than the dot-to-dot spacing L1 in the secondary scanning direction X. Moreover, the feed length Lh/N is shorter than the inter-cell spacing L2 in the secondary scanning direction X. And, the feed length Lh/N is shorter than the distance between a dot 101 in a cell 102 and a corresponding dot 101 in an adjacent cell 102, i.e., a pitch L3 of the cells 102 (see also FIG. 4), in the secondary scanning direction X. Thus, the length Lh/N is set so as to be greater than the diameter D1 of the dot 101 and less than the dot-to-dot spacing L1, the inter-cell spacing L2 and the cell pitch L3. Note however that this is one exemplary setting, which does not always need to be satisfied. Alternatively, only one or more of the diameter D1 of the dot 101, the dot-to-dot spacing L1, the inter-cell spacing L2 and the inter-cell pitch L3 may satisfy the above setting.

Note that the number of print layers preferably is three in the method for forming braille text described above, but the number is not limited to three. The number of additional print layers to be formed over the first print layer may be one, for example. Then, the total number of print layers is two.

In the method for forming braille text described above, N-layer-stacking printing is performed when forming the second print layer Ly2, but the present invention is not limited thereto. The print layer for which layer-stacking printing is performed is not limited to the second print layer. The print layer for which layer-stacking printing is performed may be a print layer other than the second print layer or may be a plurality of print layers. No print layer may be formed by layer-stacking printing, and every print layer may be formed in a single scan. In any case, it is believed that eight is sufficient for the number of print layers, for example. That is, the number of print layers may be eight or less, and the number of additional print layers may be seven or less. Moreover, the type of ink used for forming braille text is not limited to a clear ink and a white ink, but may include a color ink, for example. For example, in another preferred embodiment, the first print layer is a matte clear ink layer (single-layer), the second print layer is a glossy clear ink layer (multi-layer), and the third print layer is a color ink layer (single-layer). In still another preferred embodiment, the first print layer is a matte clear ink layer (single-layer), the second print layer is a glossy clear ink layer (multi-layer), the third print layer is a glossy clear ink layer (multi-layer), and the fourth print layer is a white ink layer (single-layer). In yet another preferred embodiment, the first print layer is a matte clear ink layer (single-layer), the second print layer is a glossy clear ink layer (multi-layer), the third print layer is a glossy clear ink layer (multi-layer), and the fourth print layer is a color ink layer (single-layer). Moreover, one may employ any combination of the number, type and order of print layers.

Second Preferred Embodiment

Figure 8:
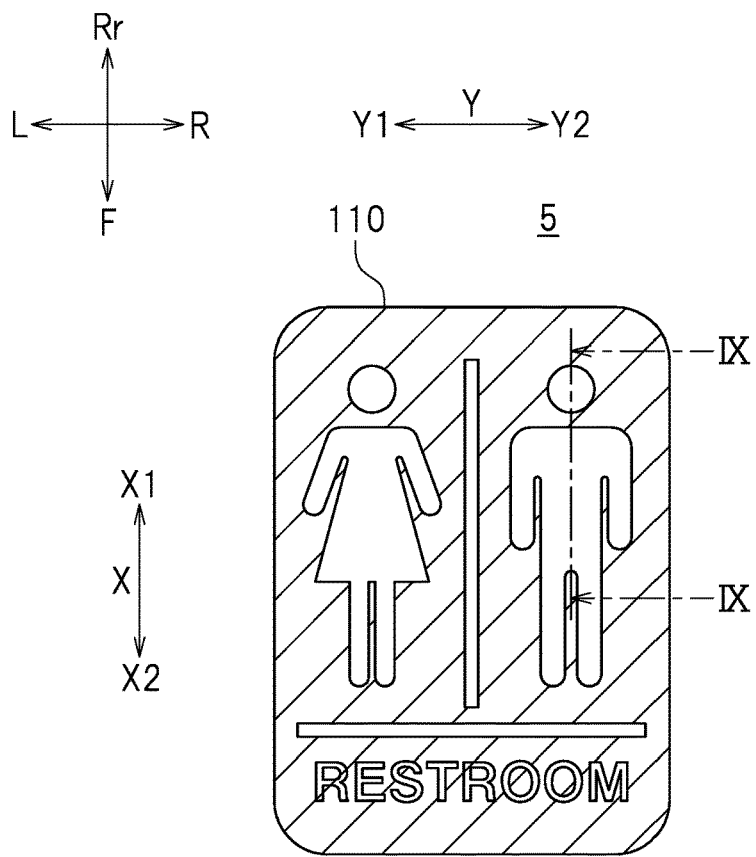
FIG. 8 shows an exemplary 3D print.

In a second preferred embodiment of the present invention, the inkjet printer 10 forms a 3D print on the recording medium 5. FIG. 8 shows an exemplary 3D print formed by the inkjet printer 10 according to the present preferred embodiment. The 3D print shown in FIG. 8 is a 3D signage 110. The entirety of the 3D signage 110 shown in FIG. 8 is raised from the recording medium 5. Moreover, non-hatched portions are sunken relative to hatched portions. The 3D signage 110 represents a predetermined sign by the planar shape formed by boundaries between hatched portions and non-hatched portions. The boundaries are formed with roundedness. The inkjet printer 10 according to the present preferred embodiment forms a 3D print such as the 3D signage 110 of FIG. 8, for example. There is no particular limitation on the type of ink used for forming a 3D print, but a color ink and a clear ink are used in the example to be discussed below.

Figure 9:
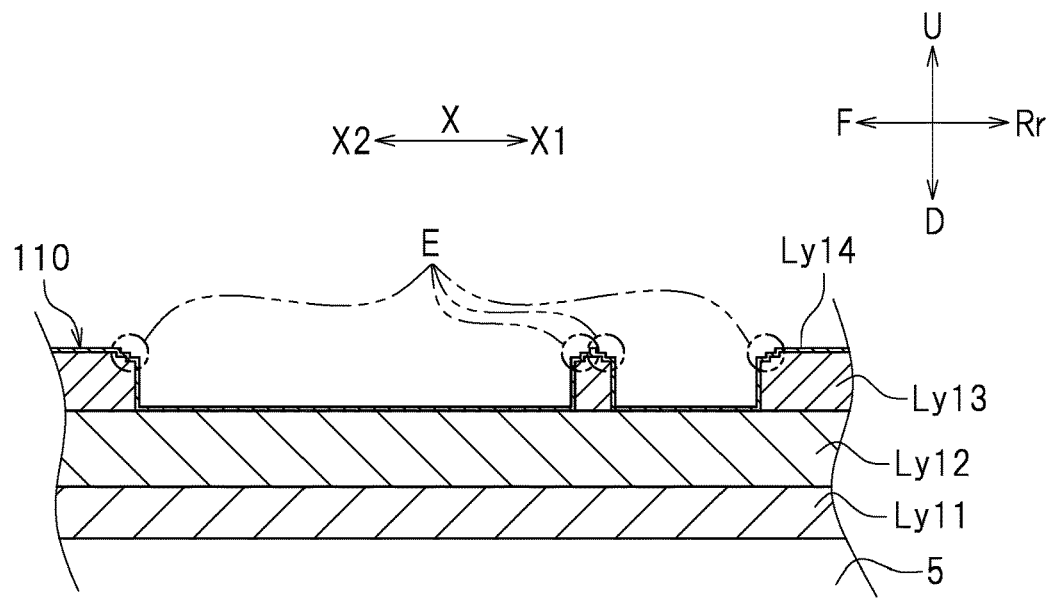
FIG. 9 is a cross-sectional view taken along line IX-IX of FIG. 8.

FIG. 9 is a cross-sectional view of the 3D signage 110 taken along line IX-IX of FIG. 8. Note however that FIG. 9 is a schematic view, and may not necessarily represent the actual proportion of the various portions. As shown in FIG. 9, the 3D signage 110 preferably includes four print layers, for example. Of the four print layers, a first print layer Ly11 is formed directly on the recording medium 5. The first print layer Ly11 is the lowermost layer of the four print layers. The first print layer Ly11 is formed from the clear ink. A second print layer Ly12 is formed directly on the first print layer Ly11. The second print layer Ly12 is also formed from the clear ink. A third print layer Ly13 is formed directly on the second print layer Ly12. The third print layer Ly13 is also formed from the clear ink. A fourth print layer Ly14 is formed directly on the third print layer Ly13. The fourth print layer Ly14 is the uppermost layer of the four print layers. The fourth print layer Ly14 is formed from the color ink.

The first print layer Ly11 according to the present preferred embodiment is a matte print layer of the clear ink. In the formation of the first print layer Ly11, the controller 30 causes the clear ink to be discharged from the ink head 21C1 while moving the carriage 1 in the first primary scanning direction Y1, as in the first preferred embodiment. The controller 30 causes UV light to be output from the second UV lamp 25b to cure the discharged clear ink immediately. The inkjet printer 10 according to the present preferred embodiment forms the first print layer Ly11 by repeating the operation described above, as in the first preferred embodiment. After printing is completed for one scanning line, the recording medium 5 is moved downstream X2 over the length Lh, as in the first preferred embodiment. For the thickness direction, the first print layer Ly11 is formed from a single shot of the clear ink.

The second print layer Ly12 is formed on the first print layer Ly11. The second print layer Ly12 according to the present preferred embodiment is a glossy print layer of the clear ink. Between the formation of the first print layer Ly11 and the formation of the second print layer Ly12, the recording medium 5 is once returned to the upstream X1 side. Then, the second print layer Ly12 is formed on the first print layer Ly11. The controller 30 causes the clear ink to be discharged from the ink head 21C1 while moving the carriage 1 in the first primary scanning direction Y1, as in the first preferred embodiment. The discharged ink is cured by UV light output from the first UV lamp 25a while the carriage 1 is being returned in the second primary scanning direction Y2.

The controller 30 forms the second print layer Ly12 bit by bit while moving the recording medium 5 downstream X2 over approximately Lh/10 per one iteration, for example, as in the first preferred embodiment. The second print layer Ly12 is formed by a process similar to that used to form the second print layer Ly2 in the first preferred embodiment. For the thickness direction, the second print layer Ly12 is formed from a plurality of shots of the clear ink. The second print layer Ly12 defines the relatively sunken portions of the upper surface of the 3D signage 110. In view of this, the second print layer Ly12 is formed to be glossy with a smooth surface.

The third print layer Ly13 defines the relatively raised portions of the 3D signage 110. The third print layer Ly13 is also a glossy print layer. The third print layer Ly13 is formed in a plurality of scans, as is the second print layer Ly12. The boundary between the side surface and the upper surface of the third print layer Ly13 is formed with roundedness, as shown in FIG. 9. The roundedness is realized by the stepped shape. In FIG. 9, the upper two layers of the third print layer Ly13 define the stepped shape. The edge portion E of FIG. 9 is where ink is not discharged during the formation of the upper two layers. The print data for the upper two layers is different from that for the other lower layers. During the formation of an actual 3D signage, every step portion sags down, to form a smooth curved surface. In the formation of the third print layer Ly13, it is possible to give corners roundedness as described above. Note that the "two layers" are merely illustrative, and it does not need to be two layers.

The fourth print layer Ly14 forms a color layer on the surface of the 3D signage 110. The fourth print layer Ly14 is formed from the color ink, giving a predetermined color or colors to the surface layer of the 3D signage 110 formed from the first print layer Ly11, the second print layer Ly12 and the third print layer Ly13. The fourth print layer is printed in a single scan.

Thus, with the inkjet printer 10 according to the present preferred embodiment, it is possible to desirably produce a 3D print. Note however that the method for producing a 3D signage using four print layers as described above is merely an example, and one may again include any combination of the number, type and order of print layers. For example, a clear ink (glossy) may be further formed as an overcoat on the color layer in order to give a glossy finish to the upper surface of the 3D signage. The shape of the 3D signage is also not limited to that shown in FIG. 8.

While preferred embodiments of the present invention have been described above, the present invention is not limited to the preferred embodiments above, and the present invention can be carried out in various other preferred embodiments.

For example, while the inkjet printer 10 according to the preferred embodiments described above preferably prints while the carriage 1 is being moved in the first primary scanning direction Y1, it may print also while the carriage 1 is being moved in the second primary scanning direction Y2. That is, the inkjet printer 10 may perform two-way printing. When printing is done while the carriage 1 is being moved in the second primary scanning direction Y2, UV light is output from the first UV lamp 25a in matte printing, and UV light is output from the second UV lamp 25b in gloss printing.

The inkjet printer 10 according to the preferred embodiments described above preferably includes the carriage 1 that can be moved in the primary scanning direction Y, with the ink discharge head 21 mounted on the carriage 1. However, the carriage 1 may not be necessary. The inkjet printer may be a line-head inkjet printer in which the ink discharge head 21 does not move in the primary scanning direction Y. The inkjet printer may include ink discharge heads extending in the primary scanning direction Y and arranged next to each other in the secondary scanning direction X, and may be configured so that the recording medium can be carried in the secondary scanning direction X. Alternatively, the inkjet printer may include ink discharge heads extending in the primary scanning direction Y and arranged next to each other in the secondary scanning direction X, and may be configured so that the ink discharge head can be moved in the secondary scanning direction X.

While the inkjet printer 10 according to the preferred embodiments described above preferably continuously feeds the recording medium 5, it may alternatively be a "flat-bed" inkjet printer.

The terms and expressions used herein are used for explanation purposes and should not be construed as being restrictive. It should be appreciated that the terms and expressions used herein do not eliminate any equivalents of features illustrated and mentioned herein, but include various modifications falling within the claimed scope of the present invention. The present invention may be embodied in many different forms. The present disclosure is to be considered as providing examples of the principles of the present invention. These examples are described herein with the understanding that such examples are not intended to limit the present invention to preferred embodiments described herein and/or illustrated herein. Hence, the present invention is not limited to the preferred embodiments described herein. The present invention includes any and all preferred embodiments including equivalent elements, modifications, omissions, combinations, adaptations and/or alterations as would be appreciated by those skilled in the art on the basis of the present disclosure. The limitations in the claims are to be interpreted broadly based on the language included in the claims and not limited to examples described in the present specification or during the prosecution of the application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method for forming braille text on a recording medium, the braille text including a plurality of cells with one or more dots included in each cell, at least one of the cells including a plurality of dots included therein, the method comprising the steps of:
   discharging a photocurable ink onto the recording medium and curing with light the discharged photocurable ink, to form a print layer on the recording medium; and
   discharging a photocurable ink onto the print layer and curing with light the discharged photocurable ink, to form at least one additional print layer on the print layer; wherein
   resultant braille text is formed by the print layer and the at least one additional print layer, and the resultant braille text has an intra-cell dot-to-dot spacing of 0.38 mm or more and 1.32 mm or less, and
   the intra-cell dot-to-dot spacing is a spacing between an outline of a first dot and an outline of a second dot adjacent to the first dot.

2. The method for forming braille text according to claim 1, wherein a number of the at least one additional print layer is seven or less.

3. The method for forming braille text according to claim 1, wherein the resultant braille text has a dot height of 0.455 mm or more and 1.045 mm or less.

4. The method for forming braille text according to claim 1, wherein ink dots of the photocurable ink upon landing have a diameter that is one half or less of a dot diameter of the resultant braille text.

5. The method for forming braille text according to claim 1, wherein:
   the forming of at least one of the print layer and the at least one additional print layer comprises a step of repeating the discharging and curing of the photocurable ink, and a step of moving the recording medium in a first direction over a first distance.

6. The method for forming braille text according to claim 5, wherein the first distance is greater than a dot diameter of the braille text formed.

7. The method for forming braille text according to claim 5, wherein:
   the plurality of cells include at least one cell with a plurality of dots included therein; and
   the first distance is less than the intra-cell dot-to-dot spacing in the first direction.

8. The method for forming braille text according to claim 5, wherein the first distance is less than an inter-cell spacing in the first direction.

9. The method for forming braille text according to claim 5, wherein the first distance is less than a distance between a dot in a first cell and a corresponding dot in a second cell adjacent to the first cell in the first direction.

10. The method for forming braille text according to claim 5, wherein:
    the at least one additional print layer includes a second print layer;
    the discharging and curing of the photocurable ink and the moving of the recording medium in the first direction are repeated a first number of iterations per a predetermined distance in the first direction, to form the print layer; and
    the discharging and curing of the photocurable ink and the moving of the recording medium in the first direction are repeated a second number of iterations, different from the first number of iterations, per the predetermined distance in the first direction, to form the second print layer.

11. The method for forming braille text according to claim 10, further comprising a step of moving the recording medium in a second direction, which is opposite to the first direction, between the step of forming the print layer and the step of forming the second print layer.

12. The method for forming braille text according to claim 10, wherein:
    in the formation of the print layer, the photocurable ink is irradiated with light after passage of a first amount of time since the discharging of the photocurable ink; and
    in the formation of the second print layer, the photocurable ink is irradiated with light after passage of a second amount of time, different from the first amount of time, since the discharging of the photocurable ink.

13. The method for forming braille text according to claim 12, wherein the second amount of time is greater than the first amount of time.

* * * * *